C. BITTINGER.
COMBINING REFLECTED AND TRANSMITTED LIGHT WAVES OF VARYING LENGTHS TO PRODUCE SUBJECTIVE CHANGES IN SCENIC EFFECTS.
APPLICATION FILED NOV. 6, 1919.
1,342,247.
Patented June 1, 1920.
2 SHEETS—SHEET 1.
Fig. 1.
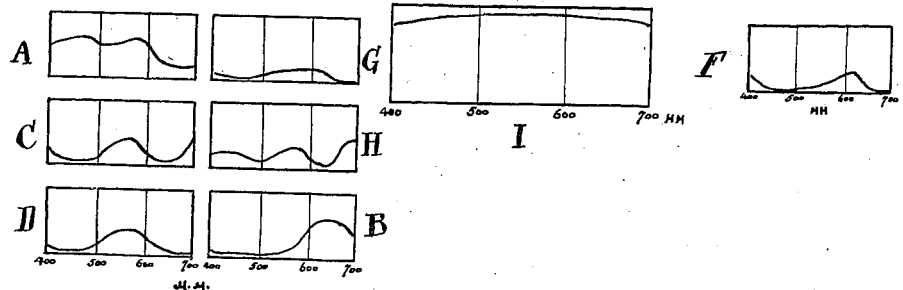
Fig. 2.
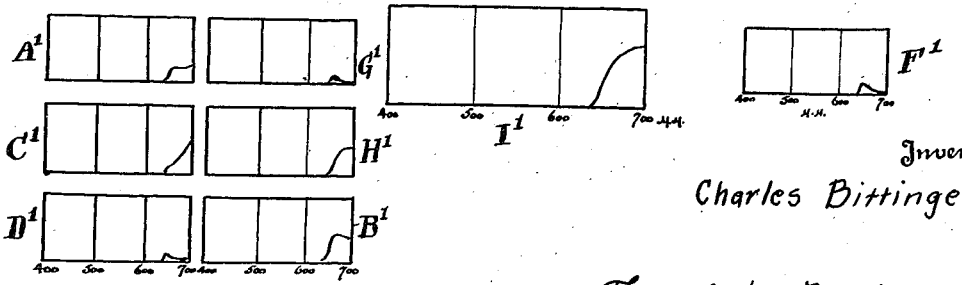
Inventor
Charles Bittinger
By Frank H. Borden
his Attorney C. BITTINGER.
COMBINING REFLECTED AND TRANSMITTED LIGHT WAVES OF VARYING LENGTHS TO PRODUCE SUBJECTIVE CHANGES IN SCENIC EFFECTS.
APPLICATION FILED NOV. 6, 1919.

1,342,247.

Patented June 1, 1920.

Inventor
Charles Bittinger
By Frank H. Borden
his Attorney

UNITED STATES PATENT OFFICE.

CHARLES BITTINGER, OF DUXBURY, MASSACHUSETTS.

COMBINING REFLECTED AND TRANSMITTED LIGHT-WAVES OF VARYING LENGTHS TO PRODUCE SUBJECTIVE CHANGES IN SCENIC EFFECTS.

1,342,247.

Specification of Letters Patent.   Patented June 1, 1920.

Application filed November 6, 1919.   Serial No. 336,030.

*To all whom it may concern:*

Be it known that I, CHARLES BITTINGER, a citizen of the United States, residing at Duxbury, in the State of Massachusetts, have invented certain new and useful improvements in combining reflected and transmitted light-waves of varying lengths to produce subjective changes in scenic effects.

My invention relates to a method of utilizing the invisible spectral differences in colors for changing the color and form of scenery for costumes, stage settings and advertising devices called broadly hereafter scene and applied as anything which produces a visual sensation.

The subjective effect of paint depends upon two factors: A, the power of the paint to reflect only light waves of certain length, and B, the spectral distribution of the light source that illuminates the paint.

It has been customary in the past either to change the spectral reflection of the paint on a scene by changing the paint, that is the scene itself is changed; or by using complementary colors to effect a change in form by contrasts of a dark figure against a lighter background. I propose to produce the same subjective result by utilizing colors of predetermined known qualities of reflection, and varying the spectral characteristics of the light source that illuminates the paint.

In carrying out my invention advantage is taken of the physiological fact that the eye is not an analytical receptor; that is, it has not the power to examine the component parts of the sensation, but receives it as a unit.

This fact enables me to apparently contradict the previously acknowledged laws of reflection. If red light is projected on red paint, green paint, and blue paint, the normal change that takes place is an increase in the brightness of the red and a decrease in the brightness of the green and blue; when green light is projected on the same paints, the green appears relatively lighter, and the red and blue relatively darker; and similarly when blue light is projected thereon the blue paint appears relatively lighter, and the green and red appear relatively darker. When necessary in order to create a desired effect, I may produce in conjunction with the normal laws of reflection an anomoly, that is, if red light is projected upon red, green and blue paint, the red will appear relatively darker, and the green and the blue relatively lighter; or I can project green light upon the colors under consideration and make the green appear dark, and the red and blue light; and I can further project blue light upon the same colors and cause the blue to appear dark and the red and green light.

These phenomenal results are obtained by utilizing the fact that the eye is more sensitive to certain radiations than others in the visible spectrum, other things being equal. This is due to the sensibility of the eye, which is recorded by a graph commonly known as the visibility curve.

As is well known, the peak of this curve varies slightly with the intensity of the light and is somewhere between 525 and 580μμ. When light reaches the retina, which contains rays in, or in close proximity to, the peak of the visibility curve, the eye is not able to detect with any degree of accuracy the quality or quantity of the light waves at the two extremities of the curve. When the spectral quality of the incident light is changed, so that it contains practically no waves at or near the peak of the visibility curve, and does contain wave lengths reflected at either or both ends thereof, and is incident upon a painting which reflects those wave lengths, the reflecting power of these waves can be detected easily, and by using pigments which reflect or absorb these waves a pictorial change can be effected. This is one phase of the utilization of the invisible spectral difference in color.

When light strikes an object which is not transparent, part is reflected from the surface, part penetrates the surface and is absorbed; the remaining light turns back in the object and leaves as reflected light. When these reflected light waves are projected in proportions differing from the combinations which will produce white light, the object is spoken of as "colored".

If light waves are sent to an object which absorbs those waves, none will be returned and the object will be blank.

By means of a spectro-photometer the relative brightness of the different light waves reflected by pigments and emitted by light sources can be determined. These are usually recorded by spectro-photometric curves.

With this data I am enabled to color part of an object or scene with pigments or dyes having predetermined known quantities and qualities of reflection and the remainder of the object or scene with pigments or dyes of different physical characteristics of reflection which appear to the eye the same when seen under a common illumination. This is due to the fact that the unaided eye cannot differentiate between the two; the colors under this illumination having a subjective similarity but an objective difference. "Subjective" means as the paint appears to the eye, and "objective" means as it really is, as determined by the physical characteristics of the paint, so that by "subjective similarity and objective difference" I mean the quality of two or more paints, pigments or dyes to produce similar sensations on the retina so that they thus appear the same to the eye of the observer, under a certain common illumination, and which pigments, paints or dyes have different physical characteristics and different powers of reflection so as to be made to appear as different colors or shades under another common illumination, and which quality of the paint, pigment, or dye is referred to as being an "objective difference". When the scene or object is illuminated by a light having a predetermined spectral quality different from the first one, a different visual effect is produced, giving thereby two or more visual changes from the same paint or dye. The reason for this will become apparent as the description proceeds.

Assuming, in the foregoing illustration, that the first pigment or dye mentioned reflected light waves from 425–580μμ and 650–700μμ and the second reflects light of from 425–550μμ, and 590–620μμ, they appear the same to the eye when illuminated by approximately white light. This due to the fact that the light waves from 650–700μμ, and 550–580μμ, produce the same effect upon the eye as do the light waves from 590–620μμ. This is an example of an invisible spectral difference, by which is meant the quality of colors to look alike to the eye when viewed under a certain common illumination, and to appear as different colors when the spectral quality of the illuminating source is changed; or colors that are subjectively similar but objectively different, this difference resides in the variations of the wave lengths of the colors, and since, as previously noted the effects may be produced from grays that have no real color, as it is commonly understood, I use the term "color" to indicate any light reflective media, whether pigment or dye and whether it has a real color or not. When a light which contains only rays from 650–700μμ is projected upon these two colors, the first will appear very bright and the second very dark. Obviously this will effect a change in the scene, caused by a change in the relative brightness of the parts.

A change in color as well as brightness can be obtained by projecting a di-chromatic light, as an example a light that contains from 425–550μμ, and from 650–700μμ on the two colors under consideration. The first mentioned color would reflect light from 425–550μμ, and 650–700μμ, which would give the sensation called purple. The second mentioned color would reflect light from 425–550μμ, which would give the sensation called blue.

Inversely, two colors that appear subjectly different can be made subjectively similar by changing the spectral quality of the illuminating source.

In the accompanying drawing:—

Figure 1 is a view of a scenic object colored in accordance with my invention, and disclosing by means of spectro-photometric graphs the spectral reflection of the colors used in the important parts of the scene, and the spectral quality of the incident light containing all the visible light waves in proportions giving the sensation of white light;

Fig. 2 is the same scene as it appears to the eye when the incident light has been changed to light containing only waves from 645–700μμ, commonly known as red, and further disclosing by means of spectro-photometric graphs the spectral reflection of the colors shown in Fig. 1 under the red illumination.

Figure 3:
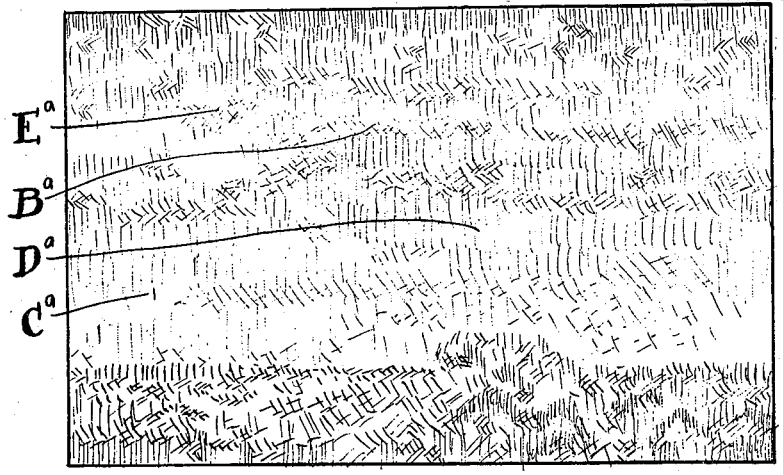
Figure 4:
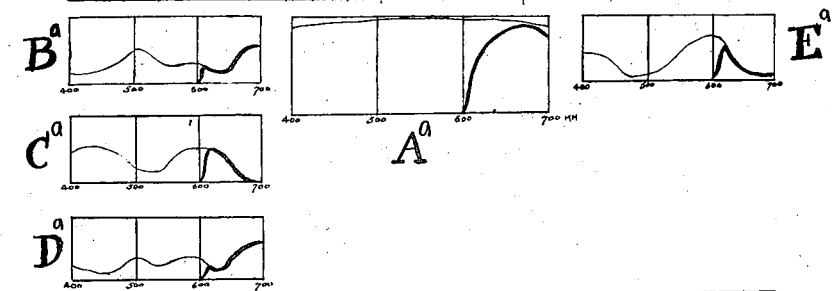
Figure 4:
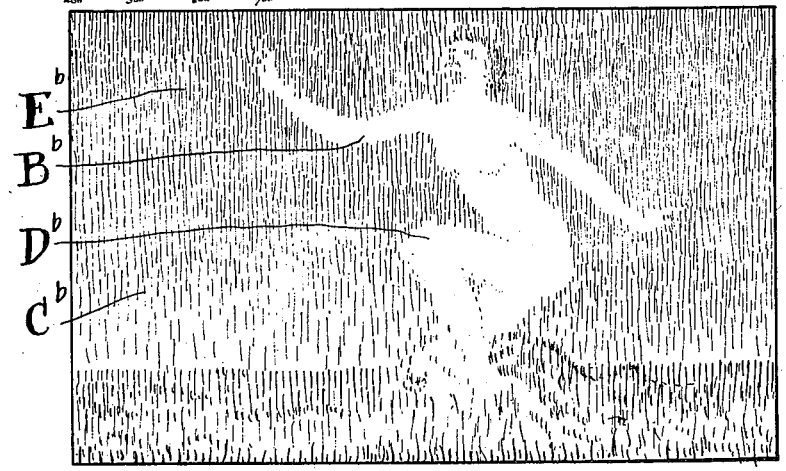

Fig. 3 is a view of a different scene, a marine, with graphs of the colors used therein showing the reflection of the various portions of the scene under white light by a light curve and under a certain red light by a dark curve; also a graph of the spectro-photometric curve of the light illuminating the scene in which the light line is the curve of substantially white light and the dark curve is of a red light; and Fig. 4 is the same scene as Fig. 3 but showing the subjective effect of illumination by a light which is subjectively similar to the red used in Fig. 3, but which light is objectively different as disclosed by the graph of the illuminating source. This figture also has graphs of the reflection of the various portions of the scene under this red light.

As shown in Fig 1, the scene as illuminated by substantially white light, is disclosed as a summer landscape in approximately normal colors. The spectro-photometric curves are graphs of the reflection under white light of the principal areas under consideration, as follows:—A, sky; B, roof; C, leaves of tree; D, leaves of tree in front of limbs; F, chimney; G, tree; H, grass; and I represents the curve of illuminating light.

As will be noted from the graphs, the sky is light blue, the roof red, the leaves both in front of the sky and the limbs are green and appear identically the same to the eye under this illumination, the chimney is orange, the tree is dark grayish green, and the grass is a warm green.

When the incident light is composed of light waves from 645-700, the observer receives the sensation of a snow scene illuminated by a red light. The reason for this change will be noted from the graphs in which A' is the sky much darker than the sky A in Fig. 1; B' reflecting practically all of the waves sent to it appears as a white roof; C' reflects the same amount of light as A' and consequently the leaves are invisible; (the incident light on this scene is practically monochromatic—the eye, therefore, can merely detect differences in brightness); D' appears much darker than D, and is of the same brightness as the tree G', giving the sensation thereby of a tree without leaves; F' appears very dark in comparison with the roof B' as it reflects very little light; H' appears very light as though it were a mass of snow in a horizontal plane, under this illumination.

It is seen from Fig. 1 the leaves are apparent to the eye, and that in Fig. 2 they are not, they disappear. Although the curve of the sky and the leaves in Fig. 2 are not exactly the same, they appear of the same brightness to the eye. This is due to the fact that the greater radiant energy of the leaves at 700µµ is balanced by the greater radiant energy of the sky at 650µµ. This might be called an invisible spectral difference of monochromatic light. In Fig. 1 we have an invisible spectral difference (under white light) of the leaves, and the leaves in front of the limbs. In this case the radiant energy of the leaves around 690µµ is balanced by a greater radiant energy around 610µµ of the leaves in front of the limbs. It will be evident that by using the invisible spectral difference I may make objects disappear without projecting a color subjectively the same as the object reflected.

The value of the invisible spectral difference in color in accentuating the pictorial change in a scene by objectively changing the incident light can be illustrated by the following points:—the chimney and roof, while of approximately the same hue, contain an invisible spectral difference arranged so that, if the incident light in question is projected on both of them, one appears light and the other dark. This is shown in the graphs B' and F'.

It will be observed that the leaves that are in front of the limbs contain an invisible spectral composition different from the leaves in front of the sky. Although all of the leaves look alike to the eye, it will be observed from graphs C and D that an invisible spectral difference exists, and as shown in graph D' the amount of light reflected approximates G', thereby giving the sensation of branches or limbs uninterrupted by leaves, while the rest of the leaves (graphs C and C') reflecting the same amount of light as the sky, disappear.

With this principle in mind, it will be apparent that by projecting a light containing two colors on the scene under consideration I am enabled to get a color contrast, or a color and brightness contrast. As an example, light from 400-500µµ and 620-700µµ.—In this instance, the sky would remain blue; the leaves would appear red; the roof, a light red, and chimney a dark red; the ground would appear red and the water blue; the tree would appear dark blue.

Further, the projection of a light containing waves from 470-520µµ, 555-575µµ, and 640-700µµ, or roughly the primary sensations, blue, green and red, the sky becomes a greenish blue; the leaves appear red, the roof, red; chimney, dark brown; the tree trunk, dark green; the water, a dark bluish green; and the field, a dark orange (synthetic).

It is also possible in utilizing the light containing the three primary sensations to obtain the sensation of white.

These effects may be obtained by projecting light waves of the specified quantity and quality, or by illuminating the object with white light and utilizing absorption media to filter out the light waves that are not desired. I have characterized this by "permitting certain rays only to reach the eye", because whether the undesired waves are in the light incident on the object, or not allowed to reach the eye after leaving the scene, the effect is the same.

To further amplify, the fact that the branches under white light are invisible, and under red light are visible, is because of a brightness difference, and with a light containing two or more colors there is a color difference, or a brightness difference, or a color and a brightness difference. Consequently, if a perfectly plain object or scene is presented, forms of different colors and brightness can be caused to appear by changing the objective quality of the light. Subjective color is not necessary. Variations of gray can be made to change either in brightness or color by objectively changing the incident light.

The object of the drawing in Figs. 3 and 4 is to illustrate the invention as applied to a scene made up of variations of grays and further, to demonstrate changing a scene pictorially without changing the light subjectively.

The sky in Fig. 3 is made up of patches of unsaturated orange and blue. The spectro-photometric curves of the blues are represented by the light line of the graphs $B^a$ and $C^a$ and the curves of the orange by the light graphs $D^a$ and $E^a$ under approximately white light indicated by the light line of the graph $A^a$. Since $B^a$ and $C^a$ look alike (although as can be noted from their respective curves they have an invisible spectral difference) and $D^a$ and $E^a$ look alike; the sky looks like a normal picture under the white light $A^a$. It will be obvious that the paints $B^a$ and $D^a$ can be painted in the form of a figure, which figure will be invisible under a white light as shown in Fig. 3. If only a red light (i. e., 640 to 700μμ.) shown by the graph $A^b$ in Fig. 4 is allowed to reach the eye, the figure will appear a light red against a dark red sky as shown by the spectro-photometric curves $B^b$, $C^b$, $D^b$, $E^b$.

If desired, a pictorial change can be made without changing the lights subjectively, if a red light is used as is represented by the heavy spectro-photometric curves in $A^a$. The dark curves $B^a$ and $C^a$ reflect the same amount of light and the heavy curves $D^a$ and $E^a$ reflect about the same. Therefore, the sky appears normal as the principal subjective difference between $A^a$ and $A^b$ is one of brightness. This can be balanced by increasing the brightness of $A^b$ when projected light is used, or reducing the brightness of $A^a$ when a filter is used, thereby obtaining a subjective pictorial change in the scene by objectively, but not subjectively, changing the light which reaches the retina.

If a minus green light, that is 400 to 500μμ. and 600 to 700μμ. is allowed to reach the eye, the figure will appear a light pink against a dark blue background (not shown).

In place of illuminating the scene with lights of special spectral characteristics, the same result may be obtained by interposing a color screen between the eye and the object.

My invention is primarily designed for theatrical effects, but obviously could be used for advertising devices and novelties of various sorts.

I claim as my invention:

1. The method of producing varying visual effects, which consists in applying color of predetermined known qualities of reflection, and possessed of an invisible spectral difference to a scene, and of utilizing said invisible spectral difference and changing the visual effect thereof by permitting certain rays only to reach the eye of the observer.

2. The method of producing varying visual effects, which consists in painting a scene with colors possessing predetermined known qualities of reflection, and an invisible spectral difference, illuminating said scene with light having predetermined spectral characteristics producing a certain visual effect, illuminating said scene with another light having a predetermined spectral quality and utilizing said invisible spectral difference to produce another visual effect.

3. The method of producing varying visual effects, which consists in coloring a scene with colors which are subjectively similar but objectively different, and coordinating therewith means for disclosing said colors as similar, and coordinating therewith means for disclosing said colors as different.

4. The method of producing varying visual effects, which consists in coloring a scene with colors which are subjectively similar but objectively dissimilar due to an invisible spectral difference, and then associating therewith means which utilize the invisible spectral difference of said colors to produce a change in visual effect.

5. The method of producing varying visual effects, which consists in coloring a scene with colors which are subjectively similar but objectively dissimilar, illuminating said scene with light which discloses the colors as subjectively similar producing a certain visual effect, illuminating said scene with light which discloses the colors as subjectively dissimilar producing a different visual effect.

6. The method of producing varying visual effects, which consists in coloring a scene with colors some of which are subjectively similar but objectively dissimilar, permitting certain rays only to reach the eye of the observer producing a predetermined visual effect, then permitting certain rays only to reach the eye of the observer producing a different predetermined visual effect.

7. The combination of a scene colored with colors of predetermined known qualities of reflection and possessing an invisible spectral difference, with means for utilizing the invisible spectral differences in said colors to produce varying visual effects.

8. The combination of a scene colored with colors of predetermined known qualities of reflection and possessing an invisible spectral difference, with means for utilizing the invisible spectral differences in said colors to produce varying visual effects by permitting certain rays only to reach the eye of the observer.

9. The combination of a scene colored with colors of predetermined known qualities of reflection and possessing an invisible spectral difference, with light sources utilizing the invisible spectral differences in said colors to produce varying visual effects.

10. As an article of manufacture a scenic object colored with colors of predetermined known qualities of reflection and possessing invisible spectral differences and producing a certain visual effect when viewed under a light of certain spectral characteristics, and utilizing the invisible spectral differences of its colors to produce a different visual effect when viewed under a light of different spectral characteristics.

11. As an article of manufacture a scenic object colored with colors some of which under a common illumination are subjectively similar but objectively different, and capable of producing varying but predetermined visual effects under varying light sources.

12. The method of producing varying visual effects which consists in applying color possessed of invisible spectral differences to a scene and of creating a predetermined visual effect thereby, and utilizing said invisible spectral differences of said colors to produce a different predetermined visual effect, by permitting certain wave lengths only to reach the eye of the observer.

13. The method of producing varying visual effects which consists in applying color of different wave lengths of reflection to a scene, some of which colors are subjectively similar but are possessed of invisible spectral differences, producing a predetermined visual effect due to the subjective similarity of said colors, and producing a different predetermined visual effect by using means utilizing said invisible spectral differences of said colors whereby said colors appear subjectively dissimilar.

14. The method of producing varying visual effects which consists in applying color of predetermined and different wave lengths of reflection to a scene, some of which colors appear to the eye of the observer to be similar, and of permitting certain wave lengths of reflection only to reach the eye of the observer and causing said colors to appear to be different.

15. The method of producing varying visual effects which consists in applying color of predetermined known qualities of reflection and having an invisible spectral difference to a scene, of coördinating therewith means for causing a predetermined visual effect thereby, and of coördinating therewith means for causing a different predetermined visual effect by utilizing said invisible spectral difference.

16. The method of producing varying visual effects which consists in coloring a scene with colors which appear to be similar but which have an invisible spectral difference, of utilizing said invisible spectral difference to disclose said colors as dissimilar.

17. The method of producing varying visual effects which consists in coloring a scene with colors which appear to be dissimilar but which have an invisible spectral similarity, and associating therewith means which utilize said invisible spectral similarity to disclose said colors as similar.

18. The method of producing varying visual effects which consists in coloring a scene with colors which under a certain coördinated illumination appear to be similar and which have invisible spectral differences creating a predetermined visual effect, and illuminating said scene with another coördinated light source disclosing said colors as different and creating another predetermined visual effect.

19. The method of producing varying visual effects which consists in obtaining one effect from a painted dyed or printed object with the light waves that have the greatest effect upon the retina, and a secondary effect from said object by utilizing light waves of equal energy that have a different effect upon the retina due to the fact that the eye is not equally sensitive to all radiations that are visible.

20. The method of producing varying visual effects which consists in applying color of different wave lengths of reflection, the difference between some of the wave lengths being invisible, of utilizing some of the wave lengths for producing a predetermined visual effect, and of associating with said colors means which utilize the invisible spectral difference of the colors to obtain different predetermined visual effects.

21. The combination with a scene colored with colors possessing invisible spectral differences, of means coördinated with said colors to produce a predetermined visual effect therefrom, and other means coördinated with said colors to produce a different predetermined visual effect therefrom.

22. The combination with a scene colored with colors of predetermined known qualities of reflection and having invisible spectral differences, with means coördinated with said colors and utilizing said invisible spectral differences to produce varying visual effects.

23. The combination with a scenic object colored with colors possessed of invisible but known and predetermined spectral differences, of means coördinated with the colors for producing a predetermined visual effect, and means coördinated with said colors and utilizing said invisible spectral differences for producing a different predetermined visual effect.

24. As an article of manufacture, a scenic object colored with colors some of which are subjectively similar but are possessed of invisible spectral differences, and are so arranged on the object that at least two predetermined but different visual effects can be produced from the scene when appropriate coördinated means are associated therewith.

In testimony whereof I have hereunto subscribed my name.

CHARLES BITTINGER.